United States Patent
Chang et al.

(10) Patent No.: US 8,512,545 B2
(45) Date of Patent: Aug. 20, 2013

(54) POROUS METAL ARTICLE AND ABOUT METHOD FOR MANUFACTURING SAME

(75) Inventors: Hsin-Pei Chang, New Taipei (TW);
Wen-Rong Chen, New Taipei (TW);
Huann-Wu Chiang, New Taipei (TW);
Cheng-Shi Chen, New Taipei (TW);
Lone-Wen Tai, New Taipei (TW);
Shun-Mao Lin, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/217,915

(22) Filed: Aug. 25, 2011

(65) Prior Publication Data
US 2012/0244377 A1 Sep. 27, 2012

(30) Foreign Application Priority Data
Mar. 23, 2011 (CN) .......................... 2011 1 0070389

(51) Int. Cl.
*C25F 3/04* (2006.01)
(52) U.S. Cl.
USPC .......................................... 205/640; 205/257

(58) Field of Classification Search
USPC ................................................ 205/640, 257
See application file for complete search history.

(56) References Cited

U.S. PATENT DOCUMENTS

| | | | | | |
|---|---|---|---|---|---|
| 2,994,951 | A | * | 8/1961 | Eubank et al. | 29/527.2 |
| 3,190,749 | A | * | 6/1965 | Fleming | 428/610 |
| 4,536,259 | A | * | 8/1985 | Oda et al. | 205/238 |
| 4,977,038 | A | * | 12/1990 | Sieradzki et al. | 428/610 |
| 5,378,330 | A | * | 1/1995 | Li et al. | 205/661 |
| 2001/0036530 | A1 | * | 11/2001 | Noda et al. | 428/104 |
| 2003/0143523 | A1 | * | 7/2003 | Kato et al. | 435/4 |
| 2003/0234183 | A1 | * | 12/2003 | Corl et al. | 205/286 |
| 2006/0271169 | A1 | * | 11/2006 | Lye et al. | 623/1.39 |

FOREIGN PATENT DOCUMENTS

CN 101337193 A * 1/2009

* cited by examiner

*Primary Examiner* — Nicholas A Smith
(74) *Attorney, Agent, or Firm* — Altis Law Group, Inc.

(57) ABSTRACT

A porous metal article includes a substrate, a metal layer formed on the substrate, and a porous metal layer formed on the metal layer. The metal layer is a noble metal layer doped with M, M comprising an element selected from a group consisting of aluminum, magnesium and calcium, the content of M in the metal layer is between about 30 wt % and about 70 wt %. The metal layer has a thickness between about 1 micrometer and about 8 micrometers. The porous metal layer has a thickness between about 2 micrometers and about 4 micrometers.

11 Claims, 1 Drawing Sheet

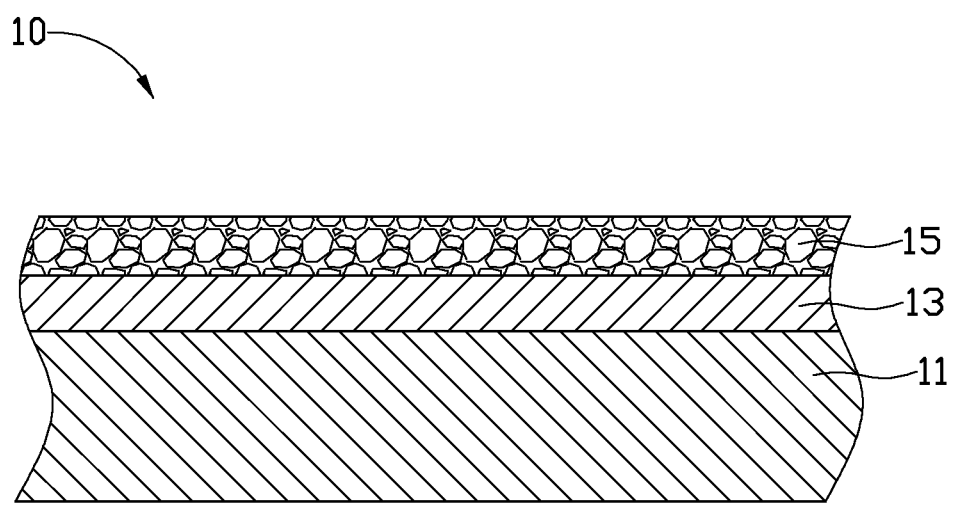

POROUS METAL ARTICLE AND ABOUT METHOD FOR MANUFACTURING SAME

CROSS-REFERENCE TO RELATED APPLICATIONS

The present application is related to co-pending U.S. patent application Ser. Nos. 13/217,906, 13/217,909, respectively entitled "POROUS SILICON ARTICLE AND ABOUT METHOD FOR MANUFACTURING SAME", "POROUS METAL ARTICLE AND ABOUT METHOD FOR MANUFACTURING SAME", by Zhang et al. These applications have the same assignee as the present application and have been concurrently filed herewith. The above-identified applications are incorporated herein by reference.

BACKGROUND

1. Technical Field

The exemplary disclosure generally relates to porous metal articles and methods for manufacturing the porous metal articles.

2. Description of Related Art

Noble metals, such as ruthenium, rhodium, palladium, silver, osmium, iridium, platinum, and gold, are resistant to corrosion and oxidation in moist air. Therefore these materials can be used as accelerators for purifying exhaust gas. The accelerating function of the noble metals is very related to their surfaces. A typical way to improve the accelerating function of the noble metals, is introducing porous holes in their surfaces. However, porous holes in noble metals surfaces may still result.

Therefore, there is room for improvement within the art.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiment of a porous metal article and method for manufacturing the porous metal article. Moreover, in the drawings like reference numerals designate corresponding parts throughout the several views. Wherever possible, the same reference numbers are used throughout the drawings to refer to the same or like elements of an exemplary embodiment.

The FIGURE illustrates a cross-sectional view of an exemplary embodiment of an porous metal article.

DETAILED DESCRIPTION

Referring to FIGURE, an exemplary method for manufacturing a porous metal article 10 may include the least the following steps.

Providing a substrate 11, which may be made of plastic or stainless steel.

The substrate 11 is pretreated. For example, the substrate 11 is washed with a solution (e.g., NaOH), and then washed with a deionized water, to remove grease, dirt, and/or impurities, followed by drying.

A green coating is formed on the substrate 11 by hot-tip coating process. The green coating includes a noble metal and M, wherein M comprises at least one selected from a group consisting of zinc, aluminum, magnesium and calcium. The content of M in the green coating is between about 30 wt % and about 70 wt % of the total weight of noble metal, M. The noble metal comprises at least one selected from a group consisting of ruthenium, rhodium, palladium, silver, osmium, iridium, platinum, or gold. During forming the green coating, the substrate 11 passes through a molten bath of noble metal and M at a temperature that is above a melting point of a noble metal M alloy about 50 Celsius degree (° C.), for about 1 minute to about 3 minutes. The green coating has a thickness between about 5 micrometers and about 10 minutes.

The green coating on the substrate 11 is electrochemically etched to remove M from an outer surface of the green coating to form a porous silicon layer 15 on the outer surface of the green coating. The portion of the green coating in which M is not removed forms a metal layer 13 on the substrate 11. During electrochemical etching, the green coating acts as an anode, a platinum plate acts as cathode, using hydrochloric acid, formic acid, acetic acid, oxalic acid or sulphuric acid as electrolyte. The content of the hydrochloric acid or sulphuric acid is between about 3 wt % and about 15 wt % of the total weight of the electrolyte. A constant power applied between the anode and the cathode may have a voltage between about 2 volts and about 5 volts, a current density between about 0.5 mA/cm2 and about 4 mA/cm$^2$ for about 5 minutes to about 20 minutes to form the porous metal layer 15. The porous metal layer 15 has a thickness between 2 micrometers and 4 micrometers. The porous metal layer 15 defines a plurality of nano-pores, and each nano-pore has a pore opening size between about 50 nanometers (nm) and about 120 nm.

The porous metal article 10 manufactured by the present method includes a substrate 11, a metal layer 13 formed on the substrate 11, and a porous metal layer 15 formed on the metal layer 13. The substrate 11 is made of stainless steel or plastic. The metal layer 13 includes a noble metal and M, wherein M comprises at least one selected from a group consisting of aluminum, magnesium and calcium. The content of M in the metal layer 13 is between about 30 wt % and about 70 wt % of the total weight of noble metal, M. The noble metal is at least one selected from a group consisting of ruthenium, rhodium, palladium, silver, osmium, iridium, platinum and gold. The metal layer 13 has a thickness between about 1 micrometer and about 8 micrometers. The porous metal layer 15 has a thickness between about 2 micrometers and about 4 micrometers. The porous metal layer 15 defines a plurality of nano-pores, and each nano-pore has a pore opening size between about 50 nanometers (nm) and about 120 nm.

EXAMPLES

Experimental examples of the present disclosure are following.

Example 1

1. Forming the Green Coating on the Substrate 11 Made of Stainless Steel, Such as Type 304 Stainless.

The substrate 11 passes through a molten bath of golden and calcium at a temperature of about 950° C., for about 3 minutes. The green coating has a thickness of about 10 micrometers. In this exemplary embodiment, golden-to-calcium mass ratio is about 1:2.

2. The Green Coating is Electrochemically Etched to Form a Porous Silicon Layer 15.

The green coating acts as an anode, a platinum plate acts as cathode, using sulphuric acid as electrolyte. The content of the sulphuric acid is about 15 wt % of the total weight of the electrolyte. A constant power applied between the anode and the cathode may have a voltage about of about 5 volts, a current density of about 4 mA/cm$^2$ for about 20 minutes to form the porous metal layer 15. The porous metal layer 15 has a thickness of about 4 micrometers. The porous metal layer 15 defines a plurality of nano-pores, and each nano-pore has a pore opening size of about 50 nm.

Example 2

1. Forming the Green Coating on the Substrate 11 Made of Ceramic, Such as Aluminum Oxide.

The substrate 11 passes through a molten bath of palladium and magnesium at a temperature of about 1350° C., for about 2 minutes. The green coating has a thickness of about 5 micrometers. In this exemplary embodiment, golden-to-magnesium mass ratio is about 63.7:36.3.

2. The Green Coating is Electrochemically Etched to Form a Porous Silicon Layer 15.

The green coating acts as an anode, a platinum plate acts as cathode, using acetic acid as electrolyte. The content of the acetic acid is about 3 wt % of the total weight of the electrolyte. A constant power applied between the anode and the cathode may have a voltage about 3 volts, a current density of about 0.5 mA/cm$^2$ for about 5 minutes to form the porous metal layer 15. The porous metal layer 15 has a thickness of about 2 micrometers. The porous metal layer 15 defines a plurality of nano-pores, and each nano-pore has a pore opening size of about 120 nm.

Example 3

1. Forming the Green Coating on the Substrate 11 Made of Ceramic, Such as Aluminum Oxide.

The substrate 11 passes through a molten bath of platinum, ruthenium and aluminum at a temperature of about 1127° C., for about 3 minutes. The green coating has a thickness of about 10 micrometers. In this exemplary embodiment, platinum-to-ruthenium-to-aluminum mass ratio is about 25:25:50.

2. The Green Coating is Electrochemically Etched to Form a Porous Silicon Layer 15.

The green coating acts as an anode, a platinum plate acts as cathode, using hydrochloric acid as electrolyte. The content of the hydrochloric acid is about 10 wt % of the total weight of the electrolyte. A constant power applied between the anode and the cathode may have a voltage about 3 volts, a current density of about 3.5 mA/cm$^2$ for about 15 minutes to form the porous metal layer 15. The porous metal layer 15 has a thickness of about 6 micrometers. The porous metal layer 15 defines a plurality of nano-pores, and each nano-pore has a pore opening size of about 80 nm.

Example 4

1. Forming the Green Coating on the Substrate 11 Made of Stainless Steel, Such as Type 304 Stainless.

The substrate 11 passes through a molten bath of iridium, osmium and magnesium at a temperature of about 950° C., for about 2 minutes. The green coating has a thickness of about 5 micrometers. In this exemplary embodiment, iridium-to-osmium-to-magnesium mass ratio is about 30:30:40.

2. The Green Coating is Electrochemically Etched to Form a Porous Silicon Layer 15.

The green coating acts as an anode, a platinum plate acts as cathode, using formic acid and sulphuric acid as electrolyte. The content of the formic acid and sulphuric acid is about 5 wt % of the total weight of the electrolyte. A constant power applied between the anode and the cathode may have a voltage about 5 volts, a current density of about 3 mA/cm$^2$ for about 6 minutes to form the porous metal layer 15. The porous metal layer 15 has a thickness of about 3 micrometers. The porous metal layer 15 defines a plurality of nano-pores, and each nano-pore has a pore opening size of about 60 nm.

Example 5

1. Forming the Green Coating on the Substrate 11 Made of Ceramic, Such as Aluminum Oxide.

The substrate 11 passes through a molten bath of platinum, silver and aluminum at a temperature of about 1400° C., for about 3 minutes. The green coating has a thickness of about 10 micrometers. In this exemplary embodiment, platinum-to-silver-to-aluminum mass ratio is about 35:35:30.

2. The Green Coating is Electrochemically Etched to Form a Porous Silicon Layer 15.

The green coating acts as an anode, a platinum plate acts as cathode, using hydrochloric acid and oxalic acid as electrolyte. The content of the hydrochloric acid and oxalic acid is about 3 wt % of the total weight of the electrolyte. A constant power applied between the anode and the cathode may have a voltage about 4 volts, a current density of about 3 mA/cm$^2$ for about 17 minutes to form the porous metal layer 15. The porous metal layer 15 has a thickness of about 4 micrometers. The porous metal layer 15 defines a plurality of nano-pores, and each nano-pore has a pore opening size of about 80 nm.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for manufacturing a porous metal article comprising steps of:
   providing a substrate;
   forming a green coating on the substrate, the green coating being directly formed by hot-dip coating process, wherein the green coating consists of noble metal and M, wherein M consists of at least one element selected from a group consisting of aluminum, magnesium and calcium, the content of M in the green coating is between about 30 wt % and about 70 wt %; and
   electrochemically etching the green coating to remove M from an outer surface of the green coating to form a porous metal layer on the outer surface of the green coating using hydrochloric acid, formic acid, acetic acid, oxalic acid or sulphuric acid as electrolyte.

2. The method of claim 1, wherein the substrate is made of ceramic or stainless steel.

3. The method of claim 2, wherein the ceramic is silicone carbide.

4. The method of claim 2, wherein the stainless steel is type 304 stainless.

5. The method of claim 1, wherein the noble metal comprises an element selected from a group consisting of ruthenium, rhodium, palladium, silver, osmium, iridium, platinum, or gold.

6. The method of claim 1, wherein during forming the green coating, the substrate passes through a molten bath of noble metal and M at a temperature that is above a melting point of a noble metal M alloy about 50° C. for about 1 minute to about 3 minutes.

7. The method of claim 1, wherein the green coating has a thickness between about 5 micrometers and about 10 micrometers.

8. The method of claim 1, wherein during electrochemical etching, the green coating acts as an anode, a platinum plate acts as cathode, using hydrochloric acid, formic acid, acetic acid, oxalic acid or sulphuric acid as electrolyte; the content of the hydrochloric acid or sulphuric acid is between about 3 wt % and about 15 wt % of the total weight of the electrolyte; a constant power applied between the anode and the cathode has a voltage between about 2 volts and about 5 volts, a current density between about 0.5 mA/cm$^2$ and about 4 mA/cm$^2$ for about 5 minutes to about 20 minutes to form the porous metal layer.

9. The method of claim 1, wherein the porous metal layer has a thickness between 2 micrometers and 4 micrometers.

10. The method of claim 1, wherein the porous metal layer defines a plurality of nano-pores, and each nano-pore has a pore opening size between about 50 nm and about 120 nm.

11. The method of claim 1, wherein the noble metal consists of at least one element selected from the group consisting of ruthenium, rhodium, palladium, silver, osmium, iridium, platinum, and gold.

* * * * *